United States Patent
Huggett et al.

(10) Patent No.: US 6,329,798 B1
(45) Date of Patent: *Dec. 11, 2001

(54) VOLTAGE CONTROLLER FOR MINIMIZING THE UTILITY POWER PROVIDED TO A LOCAL LOAD SITE HAVING A LOCAL POWER SOURCE

(75) Inventors: Colin Huggett, Torrance; Gabor Kalman, Palos Verdes, both of CA (US)

(73) Assignee: Honeywell International Inc, Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,188

(22) Filed: Dec. 11, 1999

Related U.S. Application Data

(60) Provisional application No. 60/111,797, filed on Dec. 11, 1998.

(51) Int. Cl.[7] ............................................. G05F 1/70
(52) U.S. Cl. ................................................. 323/207
(58) Field of Search .................................... 323/205, 207

(56) References Cited

U.S. PATENT DOCUMENTS

| 4,845,418 | 7/1989 | Conner . | |
|---|---|---|---|
| 5,041,959 | * 8/1991 | Walker | 323/207 |
| 5,329,221 | * 7/1994 | Schauder | 323/207 |
| 5,329,222 | 7/1994 | Guyugyi . | |
| 5,343,139 | 8/1994 | Gyugyi . | |
| 5,428,283 | 6/1995 | Kalman . | |
| 5,466,973 | 11/1995 | Griffioen . | |
| 5,734,257 | 3/1998 | Schauder . | |
| 5,734,586 | 3/1998 | Chiang . | |
| 6,107,784 | * 8/2000 | Nomiya et al. | 323/205 |

OTHER PUBLICATIONS

*Transient Phenomena in Electrical Machines* by P.K. Kovacs, published by Elsevier (1984), pp. 13–29.

* cited by examiner

*Primary Examiner*—Jeffrey Sterrett
(74) *Attorney, Agent, or Firm*—Ephraim Starr; Brian Tufte

(57) ABSTRACT

A load site voltage regulation control system. The load site receives electrical power from a utility over transmission lines. The load site also receives electrical power from a local generator unit operating with an inverter. The local generator unit and inverter arc coupled to the load by an EMI filter and a transformer. Voltage at the load is controlled by adjusting the inverter voltage using an inverter voltage command. The inverter voltage command is based on load voltage, inverter voltage, EMI filter voltage, utility supplied current, and inverter current. In one embodiment, the inverter voltage is adjusted to minimize utility supplied reactive and real power and to actively dampen EMI filter voltage, with the inverter voltage command being developed though a multi-loop PPI control system.

9 Claims, 4 Drawing Sheets

VOLTAGE CONTROLLER FOR MINIMIZING THE UTILITY POWER PROVIDED TO A LOCAL LOAD SITE HAVING A LOCAL POWER SOURCE

This application claims the benefit of U.S. Provisional Application No. 60/111,797, filed Dec. 11, 1998, the disclosure of which is incorporated herein by reference.

BACKGROUND OF THE INVENTION

The present invention relates generally to voltage controllers for power systems, and more particularly to a power system voltage controller used at a load-site.

Electrical power generation is often performed at generation sites distant from the consumers of electrical power. The electrical power is transmitted from the generation sites to the consumers by feeder distribution networks. Each consumer expects that the electrical power delivered over the feeder distribution networks will be at a stable voltage, and electrical machinery used by the consumers is likewise designed to operate at stable voltages. The voltage at the consumer end of the feeder distribution networks, however, is generally not constants For example, as large loads arc placed on the system, such as due to the operation of heavy industrial machinery, the voltage at the load site may vary.

Voltage regulation devices are therefore often used to perform voltage regulation at load sites. These voltage regulation devices are often in the form of tap changers. Tap changers operate by providing a series of connections at slightly different voltages. As the voltage at the load site changes, a mechanical switch modifies a mechanical connection to contact a tap at either a higher or a lower voltage. Tap changers, however, are relatively costly, and arc subject to mechanical failure. In order to avoid excessive wear on the tap changers and to prolong the service life of tap changers, shunt capacitors may also be used to regulate load site voltage. Shunt capacitors, however, may also be costly and are also subject to failure.

It is also often desirable to reduce power supplied by the utility, both real and reactive power, by providing locally generated power. Accordingly, sometimes local power generation units are used at the load site to supplement power supplied by the utility, as well as to regulate voltage at the load site.

An example power regulator system is illustrated in FIG. 3. In the system of FIG. 3, a local power source and associated inverter (indicated together) 351 are coupled to a transmission line at a load site. The power source and associated inverter provide power to the load. Coupled to the connection between the power source and associate inverter and the load is a filter including a capacitor (not shown). The local power source is therefore connected in parallel to the utility (not shown).

The power regulator system of FIG. 3 includes a current regulator (311 and 323). The current regulator provides a signal to the local power source and associated inverter for use in the control of the power source and associated inverter. In the system illustrated in FIG. 3, a current vector of the inverter is regulated to a desired value.

The current regulator is a vector control system based upon a park-vector, or space-vector, representation of all three-phase electrical quantities. The use of park-vectors facilitate transformation of control signals from sinusoidal values in a stationary frame to largely DC level signals in a synchronous frame. Methods of transforming signals from one reference frame to another is well known by those familiar with the art. Park vectors are described in, for example, Transient Phenomena in Electrical Machines by P. K. Kovacs, published by Elsevier (1984), the disclosure of which is incorporated herein by reference.

Accordingly, the inverter current output vector $i_{inv}$ is determined. As the inverter current output vector $i_{inv}$ is determined in the stationary reference frame, a capacitor voltage vector $v_{cap}$ is also determined for use in transforming the inverter current output vector to the synchronous frame. In order to reduce ac signal components in the synchronous frame signal, the capacitor voltage is filtered to reduce harmonics and other noise at frequencies other than those about the fundamental system frequency. Therefore, a rotational reference frame is extracted from the filtered capacitor voltage vector to form a unit vector for transformation to the synchronous frame in an extraction unit 363. The unit vector is provided to a transformation unit 332, as is the inverter current output vector $i_{inv}$. The transformation unit 332 outputs a vector $i_k$, which is comprised of essentially DC signals of a real component and a reactive component, representing the inverter current vector in the synchronous frame. The vector $i_k$, therefore, is the inverter current output vector in the synchronous frame.

The vector $i_k$ is compared with a command reference vector $i_{ikcmd}$ at a summer 323. Generally the command reference signal $i_{ikcmd}$ is empirically determined, and is changed only infrequently. As it is often desirable to provide as much real power from a local power source generator to the load as possible, the real power component is generally set to a maximum, which is a value of one power unit (p.u.) in a normalized system. The reactive component of the command reference signal $i_{ikcmd}$ is generally set to 0.

The output of the summer 323 is provided to a controller 311. The controller 311, in the prior art, amplifies the output of the summer, and provides a voltage vector command in the synchronous frame. The voltage vector command provided by the controller is transformed to the stationary frame by a transformation unit 333, again based upon a unit vector provided by the extraction unit 331. The output 313 of the transformation unit is provided to the local power source and associated inverter to control inverter operation.

The control system of FIG. 3, as described above, is well known to those skilled in the art. Such a control system reduces real power required to be supplied by a utility, as well as providing voltage regulation at a load site. The system of FIG. 3, however, does not optimize provision of reactive power to the system, and does not adaptively modify local power supply output based on changes in real power requirements. Further, in the system of FIG. 3 the filter may introduce unwanted power variation, particularly about resonant frequencies of the capacitor.

SUMMARY OF THE INVENTION

The present invention provides a load site voltage regulation control system. In one embodiment the invention comprises a power controller adapted for load site voltage regulation for a load site operating in parallel with a distant power source. The load site includes a load site power source. The power controller comprises a real power controller receiving an indication of real power supplied from the distant power source and a reference real power signal. The real power controller outputs a commanded real power signal. The power controller also comprises a reactive power controller receiving an indication of reactive power supplied from the distant power source and a reference reactive power signal. The reactive power controller outputs a commanded reactive power signal. Further, the power controller comprises a regulator controller receiving the commanded real power signal and the commanded reactive power signal, as well as an indication of power at the load. The regulator controller outputs a regulated control signal for use in load site voltage regulation.

In one embodiment the reactive power controller comprises a first controller section and a second controller section. The first controller section forming, a reactive power error signal, an indication of which is provided to the second controller section for use in forming the commanded reactive power signal.

In another embodiment, the invention comprises a method for regulating voltage at a load site connected to a utility power source over transmission lines. The load site includes a power generator unit operatively coupled to an inverter operatively coupled to a load by a path including a filter. In this embodiment the method comprises determining an indication of load voltage as well as determining an indication of commanded current provided by the utility power source to the load. The method further comprises determining an indication of inverter current and forming a commanded current signal using the indication of load voltage and the indication of utility current. The method further comprises forming an inverter voltage command using an indication of an inverter current and the commanded current signal.

Many of the attendant features of this invention will be more readily appreciated as the same becomes better understood by reference to the following detailed description considered in connection with the accompanying drawings in which like reference numerals indicate like parts throughout.

DETAILED DESCRIPTION

Figure 1:
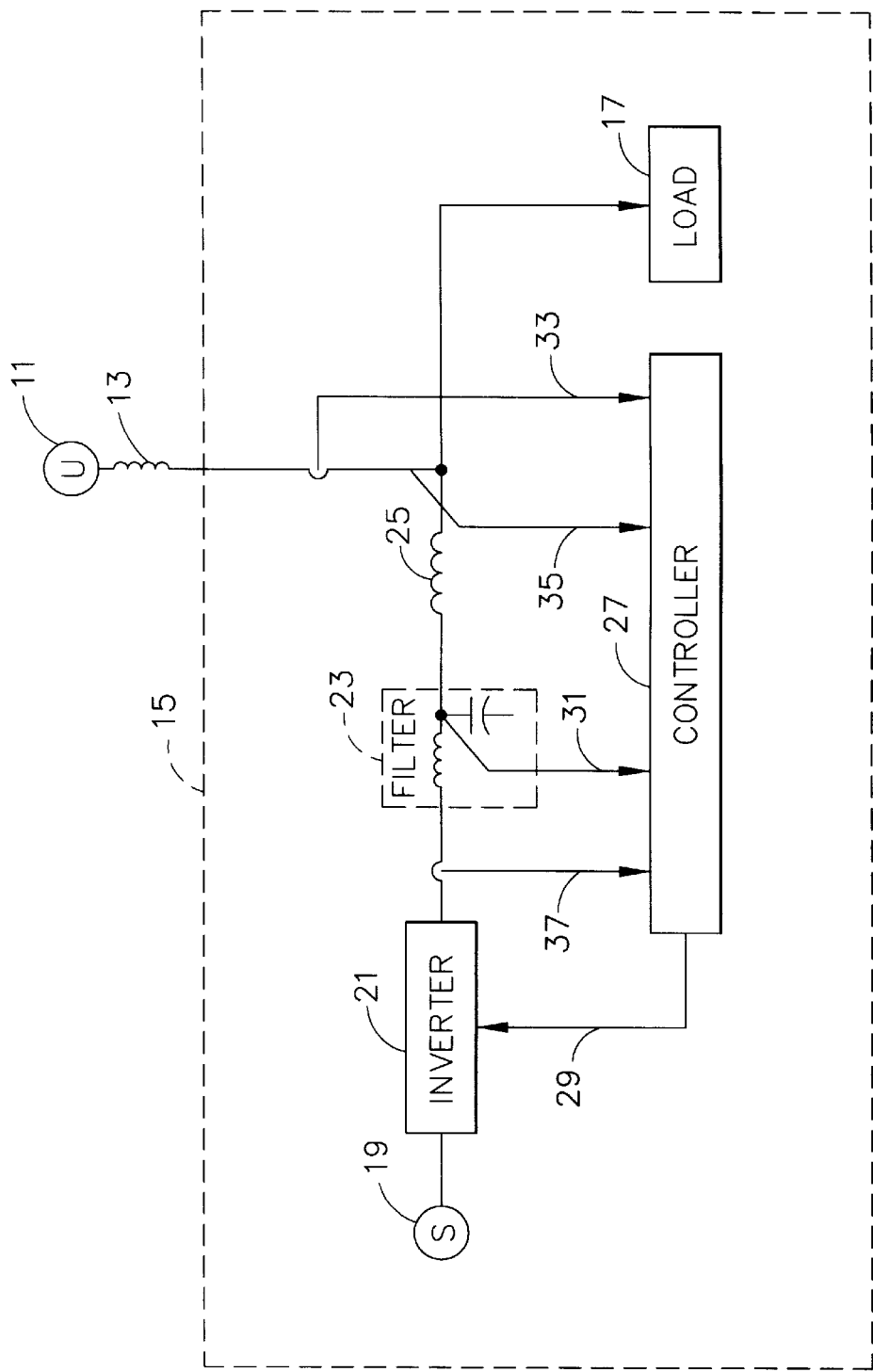
FIGS. 1 and 2 are single line diagrams of a power distribution system of the present invention.
Figure 2:
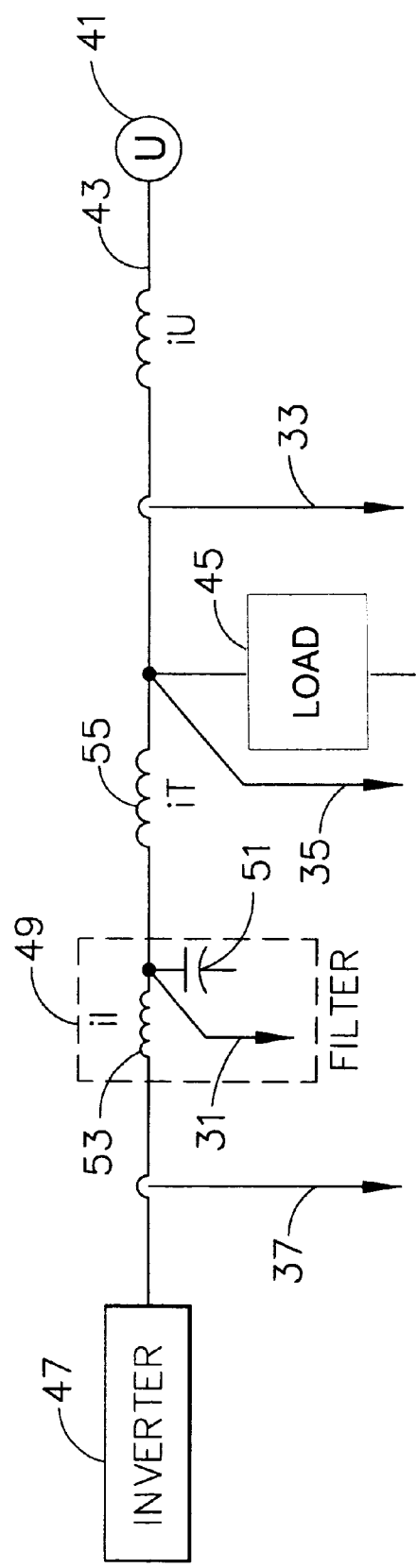

FIGS. 1 and 2 illustrate a power distribution system in accordance with the present invention. For simplicity, a single line diagram is used to represent the actual three-phase wire circuit. The power distribution system includes a utility power source 11 providing electrical power. The utility power source provides electrical power over a transmission line having an inductive impedance 13 forming part of a feeder distribution network to a consumer 15. The consumer includes a load 17. The load may be of a variety of types, such as relatively constant resistive elements, or inductive elements such as motors or the like.

The consumer additionally includes a power source generator 19, which in one embodiment is a turbogenerator unit. The use of a power source generator by the consumer at the consumer's location provides many benefits. Among these benefits are the ability to provide electrical power when the utility electrical power supply transmission is disrupted, the ability to provide regulation of utility supply power, and potentially the ability to generate power at reduced costs with respect to that provided by the utility, thereby reducing reliance on utility generated power.

The consumer power source is coupled to an inverter 21. The inverter allows for control and regulation of the electrical power generated by the power source generator. The inverter is in turn coupled to a filter 23, including an inductance and a capacitor. The filter acts as a smoothing mechanism, and reduces propagation of electrical noise and undesired frequencies output by the inverter. The output of the filter is coupled to the power transmission line by a transformer 25. The transformer is coupled to the power transmission line between the utility transmission line and the load at the consumer site.

A controller 27 provides control signals 29 to the inverter. Regulation of the operation of the inverter is accomplished, for example, using pulse width modulation (PWM). PWM methods and apparatus are well known in the art. The control signals regulate operation of the inverter. To determine the control signals to the inverter, the controller utilizes a capacitor voltage signal 31 measured at the capacitor, a utility current signal 33 measured at a point of regulation located approximate the load, a load voltage signal 35 measured at the load, and an inverter current signal 37 measured at the output of the inverter. Based on these signals, the controller manipulates the control signals to achieve desired voltage at the load.

More particularly, the controller utilizes the utility current signal and the load voltage signal to determine a first partial current command to be provided to an inverter regulator, which is part of the controller. For case of control, the utility current signal and the load voltage signal are transformed to a synchronous frame using the load voltage signal. Similarly, the capacitor voltage signal, transformed to a synchronous frame using a filtered capacitor voltage signal, is utilized by the controller to form a second partial current command to the inverter regulator. The inverter regulator in turn uses the first and second partial current commands, along with the inverter current signal transformed to the synchronous frame using the filtered capacitor voltage signal, to generate a commanded inverter voltage signal.

FIG. 2 further illustrates the power distribution system of FIG. 1. Accordingly, the system of FIG. 2 includes a utility power source 41, a load 45, and an inverter 47, filter 40 (including an inductance 52 and a capacitor 51), and a transformer 55. Also illustrated in FIG. 2 are control signals available to the controller of FIG. 1. These control signals include the inverter current 37 measured at the output of the inverter, the capacitor volta,c 31 measured at the capacitor, the load voltage 35 measured at the load, and the utility current 33 measured immediately prior to the coupling, of the line from the filter to the transmission line from the utility.

Figure 3:
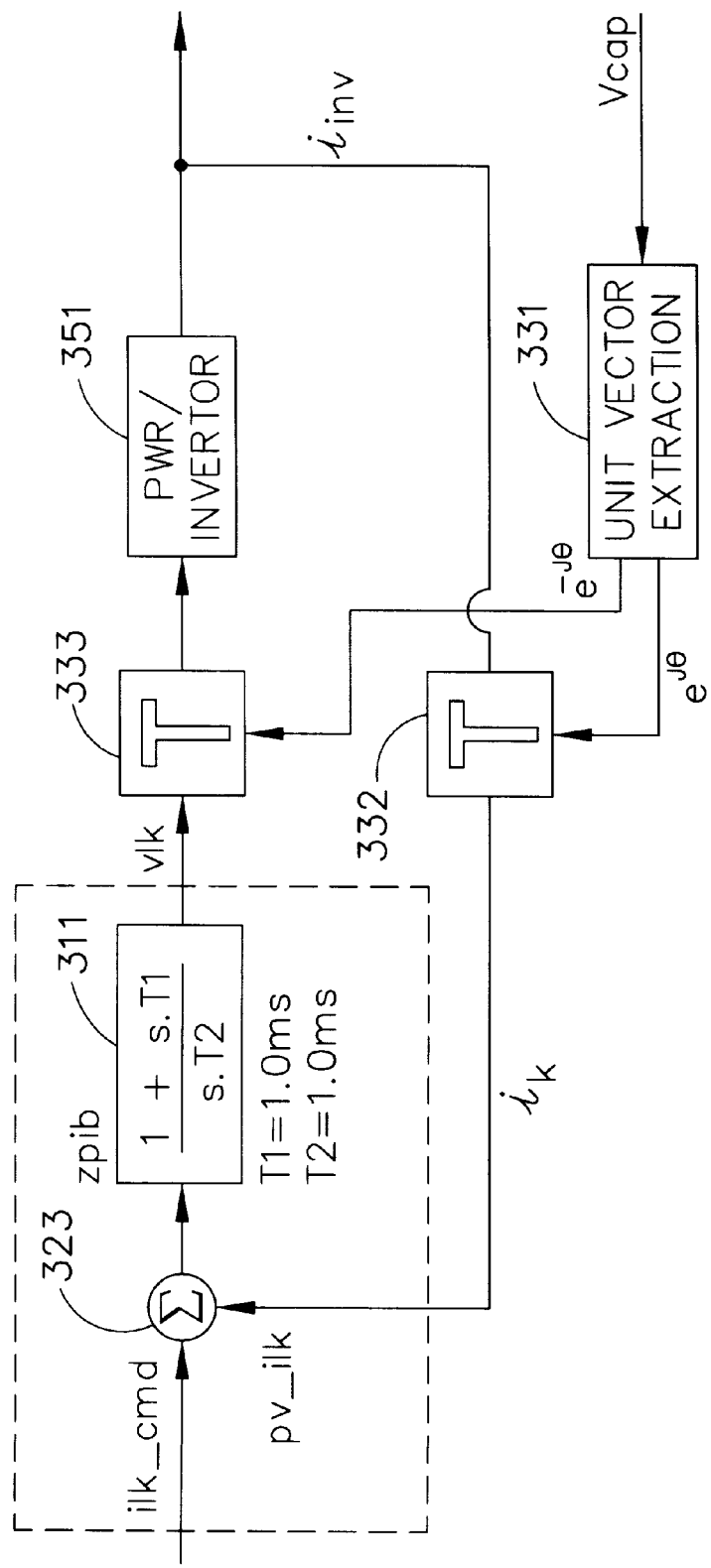
FIG. 3 is a block diagram of an inverter current regulator.
Figure 4:
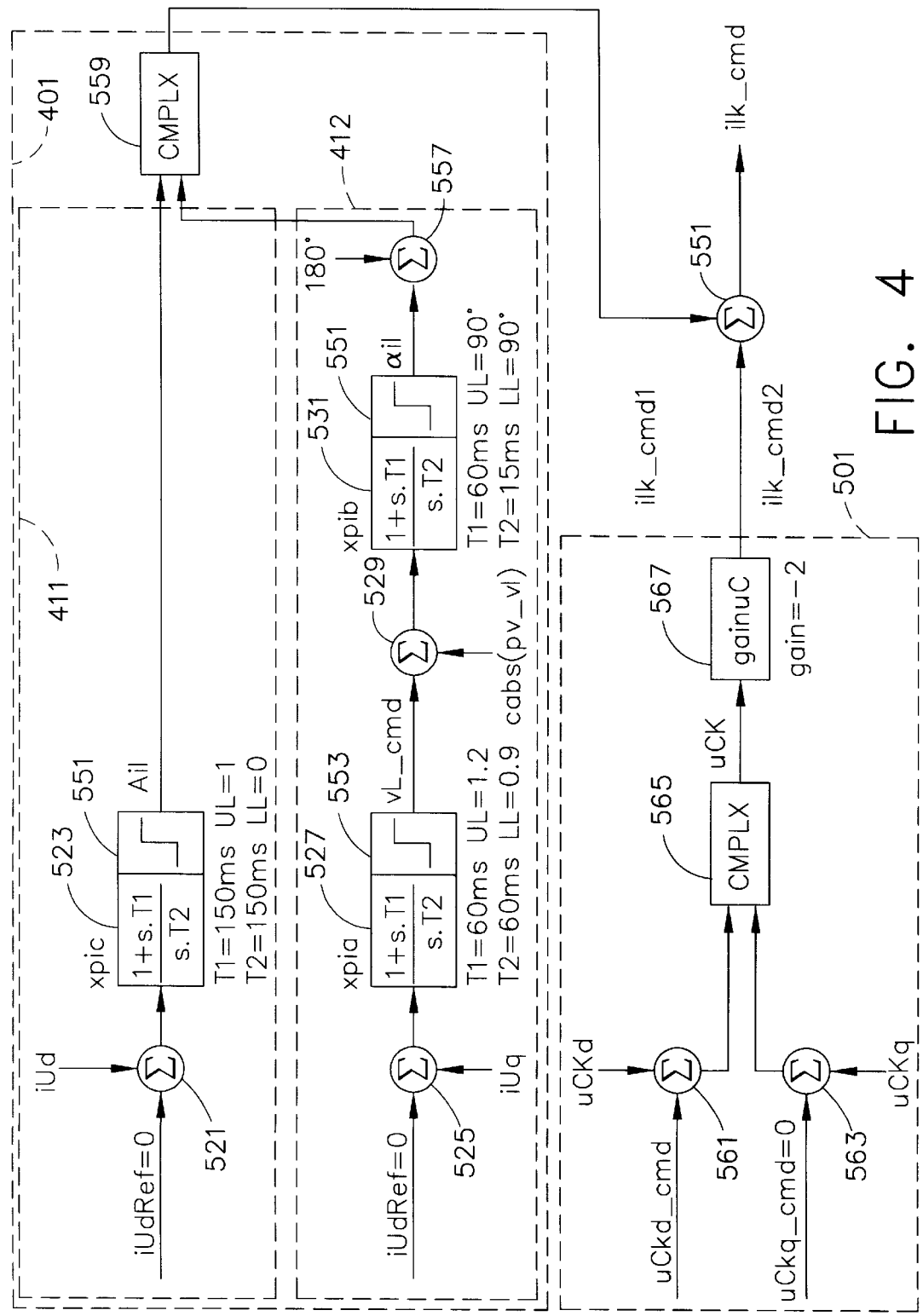
FIG. 4 is an embodiment of the control system of the present invention.

FIG. 4 illustrates an embodiment of a control system of the present invention. The control system of FIG. 4 is comprised of two main sections. A first section computes a vector current reference. A second section 501 determines a vector damping reference. The vector damping reference provides for active damping of undamped output filter of an inverter. The output from first and second sections, which comprise regulators, are vectorially summed in a summer 551 and supplied as a vector reference $i_{ikcmd}$. The vector reference $i_{ikcmd}$ corresponds to the command reference $i_{ikcmd}$ discussed with respect to FIG. 3.

Two regulators are used to compute the vector current reference. The two regulators are a real power control (411), and a reactive power control (412). The real power control reduces the real power supplied by the utility, within the capabilities of the power source and inverter. The reactive power control utilizes any excess KVA capability of the power source and inverter to reduce the reactive power supplied by the utility.

The real power control 411 minimizes the real power supplied by the utility. Thus, the real power control determines a difference between a reference value and a real component of utility current. The reference value is (by default) zero, but any fixed value can be commanded by higher-level controllers (eg. an engine fuel controller). The real component of utility current is in the synchronous frame. Therefore, as previously discussed with respect to the inverter current vector of FIG. 3, the utility current vector is transformed from the stationary frame to the synchronous frame. For the utility current signal, however, the transformation is accomplished using the voltage at the point of regulation. As is discussed later, the voltage at the load, the point of regulation, is also measured, Therefore, as a matter of convenience, the voltage at the point of regulation is used to transform the utility current signal.

The difference between the reference value and real-component of the utility current produces an error signal for a proportional plus integral (PI-type) regulator. The output of PI-type regulator—limited to 1.0 power unit—is the commanded amplitude for a basic current command (AiI) to the inverter.

The reactive power control 412 minimizes the reactive power supplied by the utility. Two loops are involved: an outer loop and an inner loop. For the outer loop the difference between a reference value (zero by default) and the imaginary component of the utility current in the synchronous frame with respect to the point of regulation produces an error signal for a PI-type regulator. The output of the second PI-type regulator is the command for the voltage amplitude at the POR—limited to 1.2 power units. The faster inner-loop takes the difference between this command and the voltage amplitude at the point of regulation (POR), and feeds the difference through a second PI-type regulator which, in turn, produces a commanded angle for the basic current commanded to the inverter. Beneficially, this angle is restricted to the appropriate quadrant, so that no real power is generated back into the inverter.

Thus, the first main section includes real power and reactive power control. Further, the real power and reactive power control is performed dynamically.

The second main section, as previously indicated, provides for active damping of the undamped output of the filter. The reference voltage for the active damper (in the synchronous frame with respect to the capacitor) is the fundamental of the capacitor voltage. The output of the second main section is a secondary current command Park-vector that modifies the basic current command Park-vector produced by the real- and reactive power controls.

Referring now to FIG. 4 in greater detail, the real power control 411 receives as inputs the real component of the utility phase current (in the synchronous frame) and a reference value. The real component of the utility phase current and the reference value are provided to a summer 521. The summer 521 output is the real component of the utility phase current subtracted from the reference value. Thus, the output of the summer 321 is the difference, or error, between the real component of utility phase current and the reference value. As it is desired to minimize utility supplied power, the reference value is set to zero. The output of the summer 521 is provided to a first unit 523. In the embodiment described the first unit is a proportional plus integral controller having a transfer function $G_1(s)$. A proportional plus integral controller provides a proportional response to an error message, as well as providing that response over a period of time. As the first unit is proportional plus integral controller the form of $G_1(s)$ is $(1+k_1s)/k_2s$. In the embodiment described the time constants $k_1$ and $k_2$ are both 150 milliseconds. In addition, the output of the proportional plus integral controller is limited by a limiter 551 to a range of 0 to 1 power units. The output of the controller 523 is a commanded amplitude for the inverter.

The reactive power control receives as inputs the reactive component of the utility phase current (in the synchronous frame) and a reference value. The reactive component of the utility phase current and the reference value are provided to a summer 525. The output of the summer 525 is the complex component of the utility phase current subtracted from the reference value. The output of the summer 525 is provided to a second unit 527. The second unit is a proportional plus integral controller, whose transfer function is $G_2(s)$. As illustrated, the time constants for the second unit proportional plus integral controller 527 are 60 milliseconds for the numerator and 60 milliseconds for the denominator. The second unit also includes a limiter 553. The limiter limits the output of the second unit to a range of 0.9 to 1.2 power units. Thus, the output of the second unit is the difference, or error, between the reactive component of the utility phase current and the reference value of zero.

The output of the proportional plus integral controller 527 is provided to a summer 529. The summer 529 is also provided the magnitude of the complex park vector of the voltage at the load. The output of the summer 529 is therefore the output of the proportional plus integral controller 527 minus the complex magnitude of the park vector of the voltage at the load. Thus, the output of the summer 529 is the difference between the reactive commanded voltage and the reactive component of voltage at the load.

The output of the summer 529 is provided to a third unit 531. The third unit is a proportional plus integral controller whose transfer function is $G_3(S)$. The third unit proportional plus integral controller has a time constant of 60 milliseconds in the numerator. In the denominator, however, the time constant is 15 milliseconds. In addition, the third unit includes a limiter 551. The limiter limits the angle of the output of the third unit to between −90° and 90°. The output of the third unit is provided to a summer 557. The summer 557 additionally receives an angle of 180°. The addition of the 180° serves to limit the commanded angle to 90°–270°. The output of the real power control, which corresponds to a commanded amplitude for current, and the output of the reactive power control, corresponds to commanded current angle, are provided to a complex summer 559. The complex summer forms a first partial current command signal. The first partial current command signal is provided to a summer 571. The summer 551 forms the vector reference $i_{ikcmd}$.

With respect to the active damping component. The second main section receives as inputs both real and reactive components of capacitor (filter) voltage and real and reactive components of commanded capacitor voltage. Therefore, a park vector indicative of the capacitor voltage is provided as one input to summers 561 and 563 of the second main section. A park vector indicative of the commanded capacitor voltage is the other input to the summers 561 and 563. The output of the summers are summed in a complex summer 565, and is the park vector indicative of the commanded capacitor voltage minus the park vector indicative of the capacitor voltage.

The output of the summer 413 is provided to a inverting amplifier 567. As illustrated, the gain of the inverting amplifier is −2. The output of the inverting amplifier 567 is provided as an additional input to the summer 551. The output of the inverting amplifier is added with respect to the other inputs to the summer 551. As the output of the inverting amplifier 415 is negative when the capacitor voltage exceeds the commanded capacitor voltage, the effect of the fourth section serves to dampen the commanded inverter voltage.

Thus, the first partial inverter command and second partial inverter commands are combined in a summer 551. The output of the summer 551 corresponds to an inverter current command. As indicated with respect to FIG. 3, the inverter current command is compared to park vector of actual inverter current in a summer 323. The output of the summer 323 is provided to a fourth unit 311, which is a proportional plus integral controller of the fourth section of FIGS. 3 and 4. The time constants for the fourth unit are 1.0 milliseconds in the numerator and 1.0 milliseconds in the denominator. The output of the fourth unit is the commanded voltage for the inverter, in the synchronous reference frame.

Although this invention has been described in certain specific embodiments, many additional modifications and variations will be apparent to those skilled in the art. It is therefore to be understood that this invention may be practiced otherwise than as specifically described. Thus, the present embodiments of the invention should be considered in all respects as illustrative and not restrictive, the scope of the invention to be indicated by the appended claims and their equivalents rather than the foregoing description.

What is claimed is:

1. A method for regulating the voltage at a load site, the load site receiving power signals from a distant power source and having a load site source and a load, the load site source having a maximum power producing capability including a maximum real and reactive power producing capability, and the load having a real and a reactive power requirement, the method comprising the steps of:

dynamically monitoring the real power required by the load;

allowing the load site source to provide a predetermined portion of the real power required by the load up to the maximum real power producing capability of the load site source; and allowing the distance power source to provide any remaining real power required by the load.

2. A method according to claim 1 wherein the load site source is allowed to provide all of the real power required by the load up to the maximum real power producing capability of the load site source.

3. A method according to claim 1 further comprising the step of using any excess power producing capability of the local site source to minimize the reactive power required from the distant power source.

4. A power controller adapted for load site voltage regulation, the load site receiving power from a distant power source and the load site including a load site source and a load, the power including current and voltage signals from the distance power source which are either directly or indirectly coupled to the load, the load site source having a maximum power producing capability including a maximum real and reactive power producing capability, and the load having a real and a reactive power requirement, the power controller comprising:

a regulator controller coupled between the local site source and the load, the regulator controller allowing any excess power producing capability of the local site source to minimize the reactive power required from the distant power source.

5. A power controller according to claim 4 wherein the regulator controller causes the load site source to provide substantially all of the real power required by the load up to the maximum real power producing capability of the load site source, after which the regulator controller causes the distance power source to provide any remaining real power required by the load.

6. A power controller according to claim 4 wherein the regulator controller attempts to match the real power provided by the load site source with the real power required by the load when the real power required by the load is less than the power producing capability of the local site source.

7. The power controller according to claim 4, wherein the regulator controller adjusts the angle of the power provided to the load by the local site source such that the reactive power required from the distant power source is minimized.

8. The power controller according to claim 4, wherein the regulator controller uses any excess power producing capability of the local site source to adjust the angle of the power provided to the load by the local site source such that the reactive power required from the distant power source is minimized.

9. A method for regulating the voltage at a load site connected to a utility power source over transmission lines, the load site including a power generator unit operatively coupled to an inverter operatively coupled to a load by a path including a filter, the method comprising:

determining an indication of load voltage;

determining an indication of utility current provided by the utility power source to the load;

determining an indication of inverter current;

forming a commanded current signal using the indication of load voltage and the indication of utility current;

determining a real component of utility current;

comparing the real component of utility current to a reference signal to form a commanded amplitude of current;

determining a reactive component of utility current;

comparing the reactive component of utility current to an indication of load voltage for form a commanded angle of current; and combining the commanded amplitude of current and the commanded angle of current to produce a commanded current signal; and forming an inverter voltage command using the indication of inverter current and the commanded current signal.

* * * * *